United States Patent
Ikeda et al.

[11] 3,945,990
[45] Mar. 23, 1976

[54] DISAZO COMPOUNDS CONTAINING AN ALKANOLAMINE SUBSTITUTED TRIAZINE COMPONENT

[75] Inventors: Takuo Ikeda, Ibaraki; Takushige Hadano, Nishinomiya; Syunsuke Nogi, Toyonaka, all of Japan

[73] Assignee: Sumitomo Chemical Company, Limited, Osaka, Japan

[22] Filed: Oct. 5, 1973

[21] Appl. No.: 403,975

[30] Foreign Application Priority Data
Oct. 16, 1972  Japan............................. 47-103778

[52] U.S. Cl................................. 260/153; 260/205
[51] Int. Cl.²......................................... C09B 43/16
[58] Field of Search.................................... 260/153

[56] References Cited
UNITED STATES PATENTS

| | | | |
|---|---|---|---|
| 2,835,663 | 5/1958 | Benz | 260/153 |
| 3,072,454 | 1/1963 | Long et al. | 260/153 |
| 3,658,783 | 4/1972 | Knobloch et al. | 260/153 |

FOREIGN PATENTS OR APPLICATIONS

| | | | |
|---|---|---|---|
| 33-7643 | 8/1958 | Japan | 260/153 |

Primary Examiner—Charles F. Warren
Attorney, Agent, or Firm—Wenderoth, Lind & Ponack

[57] ABSTRACT

A compound of the formula, as a free acid,

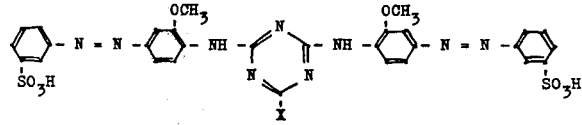

wherein X is an alkanolamine residue, such as diethanolamine, which is useful for dyeing paper and pulp to give yellow dyeings with good light fastness.

2 Claims, No Drawings

DISAZO COMPOUNDS CONTAINING AN ALKANOLAMINE SUBSTITUTED TRIAZINE COMPONENT

The present invention relates to a new yellow dye for dyeing cellulose, particularly paper and pulp.

Among the yellow dyes which have been used for dyeing paper and pulp, as a bright greenish yellow dye there are known dyes defined by C.I. Direct Yellow 8 (C.I. No. 13920) and C.I. Direct Yellow 27 (C.I. No. 13950), and as a reddish yellow dye there are known dyes defined by C.I. Direct Yellow 50 (C.I. No. 29025) and C.I. Direct Yellow 12 (C.I. No. 24895), as follows.

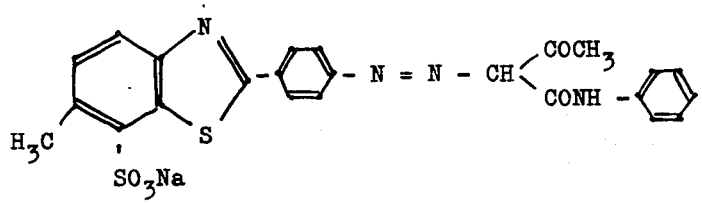

C.I. No. 13950

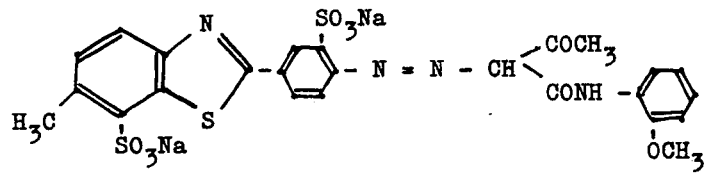

C.I. No. 29025

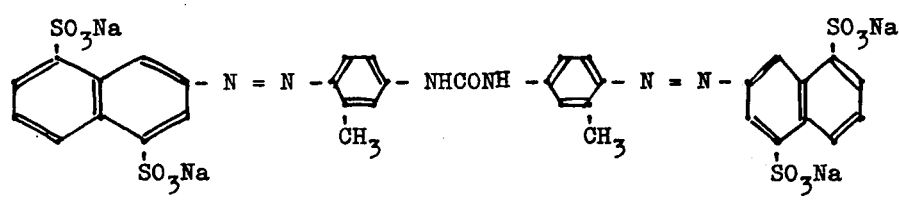

C.I. No. 24895

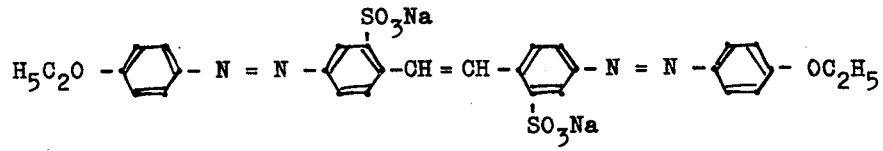

Furthermore, as an neutral yellow dye between the two, a dye defined by C.I. Direct Yellow 44 (C.I. No. 29000) of the formula (A), and a dye of the formula (B) disclosed in Example 3 of Japanese Pat. No. 7643/1958 have widely been used.

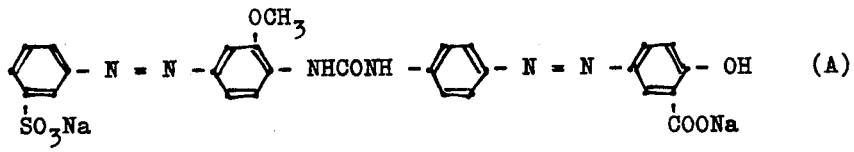

(A)

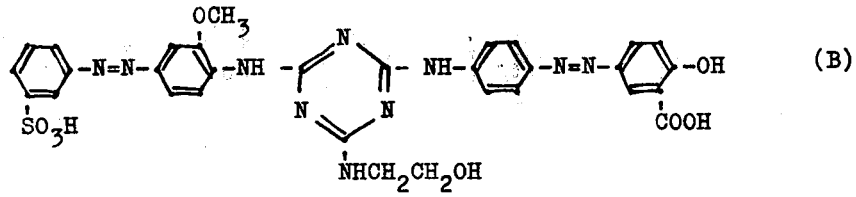

(B)

However, the dye (A) has disadvantageously a low storage stability of aqueous dye solution, and a low affinity to pulp thereby causing a problem of staining waste water. The dye (B) has a high affinity to pulp, however its solubility is low. In addition, the two dyes (A) and (B) have a disadvantage of changing their shades by an iron ion in water.

An object of the present invention is to provide a dye which is free from the effect of metal ion, and has a good affinity, solubility and in addition light fastness, by overcoming the disadvantages of the two dyes (A) and (B).

The object can be achieved by providing a new dye of the formula,

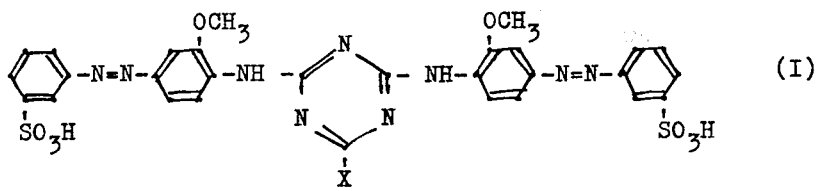

wherein X is an alkanolamine residue, and a method for preparing said new dye characterized by reacting 1 mole of cyanuric halogenide with 2 moles of 3-methoxy-4-aminoazobenzene-3'-sulfonic acid and 1 mole of an alkanolamine in an optional order.

The inventors have studied also on replacing the alkanolamine residue represented by X in the formula (I) by other amine residues, and found that, when X is the alkanolamine, for example, especially monoethanolamine, diethanolamine, monopropanolamine or dipropanolamine, most preferably diethanolamine, the dyes have a very high affinity to cellulose, particularly paper and pulp, and a high solubility.

The cyanuric halogenide employed for preparing the dye of the present invention include cyanuric bromide and generally cyanuric chloride. 3-Methoxy-4-aminoazobenzene-3'-sulfonic acid is a known intermediate and can be prepared by a conventional method.

The reaction of a cyanuric halogenide with 3-methoxy-4-aminoazobenzene-3'-sulfonic acid and an alkanolamine can be carried out in an aqueous medium, if necessary in the presence of an organic solvent, by a stepwise condensation reaction, the first being at from −10° to 20°C., the second being at from 20° to 60°C. and the third being at from 60° to 110°C. The order of the reaction of the halogenide with the azobenzene and the alkanolamine can be altered optionally. In some cases, a surfactant may be added to allow the reaction to proceed smoothly. The aimed dyes can be separated as a metal salt thereof by conventional processes such as a salting out, or in a powder form directly by spray-drying of the reaction solution. The dyes can be applied to dyeing, in the form of powder, or if necessary, in the form of liquid formulation. Furthermore, the dyes can be obtained as an ammonium salt or organic amine salt thereof.

The dyes of the present invention are particularly suitable for dyeing paper and pulp. The dyes can be applied to them by a beater addition process in which the dye solution is added to a pulp liquor under stirring and then the pulp dyed is subjected to the manufacture of paper, or by a size press process in which sheet formed paper is dipped in the dye bath containing a size and press-dried. Furthermore, the dyes can also be used for dyeing cotton and rayon by a conventional exhaustion dyeing process or padding process, and particularly advantageously for dyeing polyester/cotton blended yarns by an one-bath high temperature dyeing process.

As mentioned above, the dyes of the present invention are suitable for dyeing natural and regenerated cellulosic fibers, paper and pulp, to give neutral yellow dyeings with an excellent lightfastness. The dyes have superior properties to the conventional dyes (A) and (B) as shown in the following Table.

Table

| Property | Dye | | |
|---|---|---|---|
| | The present dye (I) | Known dye (A) | Known dye (B) |
| Solubility (g/l.) 80°C. | 70 | 100 | 30 |
| 20°C. | 25 | 40 | below 10 |
| Storage stability of dye liquor | 50 g/l. No change after 3 days | 50 g/l. Gel-formation after 3 days | 30 g/l. Gel-formation after 3 days |
| Degree of staining of waste water on pulp-dyeing according to Example 3 | Hardly stained | Considerably stained | Hardly stained |
| Effect of an iron ion[1] | Become slightly reddish | Become very reddish and dark | Become very reddish and dark |
| Light fastness[2] (non-size paper) | 5 | 4 | 4 – 5 |

Note:
[1] A pulp-dyeing test with an addition of ferric chloride (FeCl$_3$) corresponding to 10 p.p.m. of ferric ion.
[2] Rated by the Grey Scale according to JIS L 1044, 8 denoting the highest and 1 denoting the lowest.

The present invention will be illustrated in more details with reference to the following examples, which are only given for the purpose of illustration and are not to be interpreted as limiting. In the examples, all parts are by weight.

EXAMPLE 1

65.8 parts of sodium 3-methoxy-4-aminoazobenzene-3'-sulfonate were dissolved in 180 parts of water, and 18.5 parts of cyanuric chloride were added thereto at 5°C. Then the solution was heated to from 60° to 65°C. while adjusting the pH of the solution to from 6 to 7 with sodium carbonate, and maintained at the same temperature for 2 hours while stirring. 30 parts of diethanolamine were added to the solution which was then refluxed to complete the reaction. After salting out the solution with common salt, the precipitates were filtered and dried to give 100 parts of a dye in the form of brown powder. The dye thus obtained of the following formula gives dyeings of a yellow shade on cellulosic fibers.

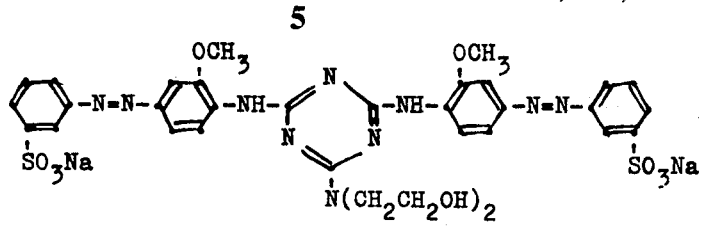

EXAMPLE 2

A dye was prepared in the same manner as described in Example 1, except that 30 parts of diethanolamine were replaced by 18 parts of monoethanolamine. 100 parts of a dye in the form of brown powder were obtained. The dye showed the dyeing properties similar to that of the dye in Example 1.

EXAMPLE 3

A dye was prepared in the same manner as described in Example 1, except that 30 parts of diethanolamine were replaced by 40 parts of dipropanolamine. 103 parts of a dye in the form of brown powder giving dyeings of a yellow shade on cellulose were obtained.

EXAMPLE 4

0.05 part of the dye obtained in Example 1 was dissolved in 250 parts of water to make a dyeing bath. 5 parts of viscose rayon yarns were introduced into the dyeing bath which was then heated to 85°C. After 10 minutes, 0.5 part of Glanber's salt anhydrous was added and dyeing was carried out for 35 minutes. After rinsing, bright yellow dyeings were obtained.

EXAMPLE 5

0.05 part of the dye obtained in Example 1, 0.1 part of Sumikaron Yellow SE-5G (a trade name for a disperse dye sold by Sumitomo Chemical Company, Limited), 0.25 part of Sumipon TF (a trade name for a surfactant sold by Sumitomo Chemical Company, Limited) and 0.5 part of Glanber's salt anhydrous were dissolved in 250 parts of water to make a dyeing bath. 5 parts of polyester/rayon blended yarns were introduced into the dyeing bath which was then heated to 90°C. over 20 minutes, and further to 130°C. over 40 minutes. Dyeing was carried out at the same temperature for 60 minutes. After dyeing, the bath was cooled to 90°C. gradually and maintained at the same temperature for 20 minutes. Dyed materials were taken out, rinsed and dried to give dyeings of a bright yellow shade on both a polyester portion and a rayon portion.

EXAMPLE 6

0.1 part of the dye obtained in Example 1 was introduced into 500 parts of a pulp liquor containing 20 g. of L.B.K.P. (Laubholz Bleached Kraft Pulp) beaten to 500 C.F. (Canadian Freeness) of water leakiness per liter of water. After the liquor was thoroughly stirred for 10 minutes, 0.33 part of Size Pine E (a trade name for a size sold by Arakawa Rinsan Co., Ltd.) was added thereto and after 10 minutes 0.3 part of aluminum sulfate crystals was further added. Dyeing was carried out for 20 minutes while stirring. On sheet forming from the pulp liquor, bright yellow colored paper was obtained.

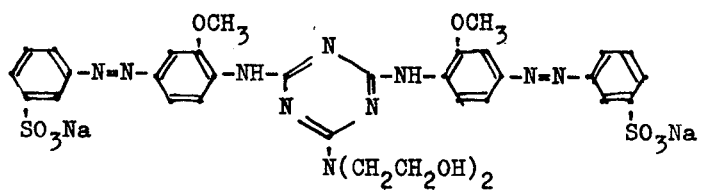

What we claim is:

1. A compound of the formula, as a free acid,

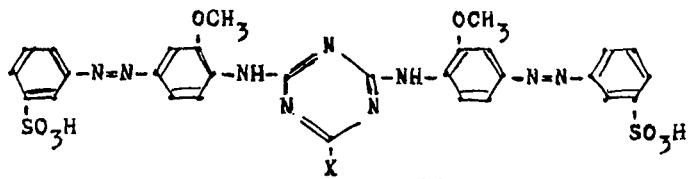

wherein X is selected from the group consisting of monoethanolamine, diethanolamine, monopropanolamine and dipropanolamine.

2. A compound of the formula,